United States Patent [19]

Akesaka

[11] Patent Number: 4,874,268

[45] Date of Patent: Oct. 17, 1989

[54] METHOD AND APPARATUS FOR BUILDING PIPELINE AND SHIELD TUNNELLING MACHINE

[75] Inventor: Toshio Akesaka, Yokohama, Japan

[73] Assignee: Kabushiki Kaisha Iseki Kaihatsu Koki, Tokyo, Japan

[21] Appl. No.: 259,927

[22] Filed: Oct. 19, 1988

[30] Foreign Application Priority Data

Nov. 18, 1987 [JP] Japan .................................. 62-289565

[51] Int. Cl.⁴ .............................................. E02D 29/10
[52] U.S. Cl. .................................... 405/184; 405/146; 405/154; 175/62
[58] Field of Search ................ 405/184, 154, 141, 146; 175/62

[56] References Cited

U.S. PATENT DOCUMENTS

| | | | |
|---|---|---|---|
| 3,630,295 | 12/1971 | Coyne et al. | 405/184 X |
| 3,805,899 | 4/1974 | Hicks et al. | 175/62 X |
| 4,647,256 | 3/1987 | Hahn et al. | 405/184 |

Primary Examiner—Dennis L. Taylor
Assistant Examiner—J. Russell McBee
Attorney, Agent, or Firm—Mattern, Ware, Stoltz & Fressola

[57] ABSTRACT

An apparatus for building a new pipeline while breaking a plurality of existing pipelines extending parallel to each other, comprises: a shield tunnelling machine for performing the excavating operation while breaking opposed portions of a plurality of existing pipelines; and a basic thrust mechanism for thrusting a new pipe into a space obtained through excavation by the machine while advancing the machine; wherein the shield tunnelling machine includes a shield body, a cutter assembly disposed in front of the shield body to be rotatable about the axis parallel to the axis of the body and dimensioned for breaking opposed portions of the existing pipelines while the body is advanced and a pair of stabilizers positioned on the outer periphery of the body so as to project respectively from a pair of opposite outer peripheral portions of the body and dimensioned to be slidably engaged with the remaining portion of the existing pipelines opposed to each other when the body is advanced.

4 Claims, 4 Drawing Sheets

METHOD AND APPARATUS FOR BUILDING PIPELINE AND SHIELD TUNNELLING MACHINE

BACKGROUND OF THE INVENTION

1. Field of the Invention:

This invention relates to a method and an apparatus for building a pipeline and a shield tunnelling machine used for building the pipeline and, more particularly, to a method for building a new pipeline while breaking a plurality of pipelines built in the ground and extending parallel to each other to lay the new pipeline in place of the broken pipeline; and to an apparatus for embodying this method and an excavating machine used for building the pipeline.

2. Description of the Prior Art:

In one of methods for building a new pipeline having a diameter larger than those of a plurality of existing pipelines such as sewer pipes, power line pipes, telephone line pipes, or the like while breaking the existing pipelines, there has been generally employed a method of construction which comprises the steps of excavating a ditch in a spot where the existing pipes to be renewed are disposed, extending the ditch to expose and remove the pipes, disposing a new pipe in place of the existing pipes and thereafter refilling the ditch. According to this method of construction, it is necessary to excavate the ditch. Therefore, this method is limited to locations where such excavations are possible.

In order to overcome the above problem, it is possible to renew a plurality of existing pipelines into a new pipeline by utilizing a pipe propelling method. However, according to the conventional pipe propelling method, a shield body is rotated by a reaction of rotation of a cutter assembly, and the cutter assembly has to be rotated clockwise and counter clockwise. Further, the troublesome operation of controlling the advancing direction of the machine has to be done in order to advance the excavating machine along a predesigned route.

SUMMARY OF THE INVENTION

An object of the present invention is to provide a pipeline building method, an apparatus therefor and a shield tunnelling machine used for building the pipeline, wherein the pipeline can be newly built without using any cut-and-cover method and without any troublesome directional control for advancing the excavating machine along a predesigned route.

According to the present invention, a method for building a new pipeline while breaking a plurality of existing pipelines extending parallel to each other comprises the steps of advancing a shield tunnelling machine for performing an excavating operation while breaking the existing pipelines by using the machine to form a pair of opposed remaining portions of the pipelines and disposing a new pipe in place of the broken existing pipes, wherein at least a pair of opposed stabilizers projecting from a shield body of the machine are dimensioned to be engaged slidably with a pair of the remaining portions of the existing pipelines opposed to each other during the operation of advancing the machine.

A pipeline building apparatus according to the present invention for building a new pipeline while breaking a plurality of existing pipelines extending parallel to each other comprises a shield tunnelling machine for performing the excavating operation while breaking opposed portions of a plurality of existing pipelines and a basic thrust mechanism for thrusting a new pipe into a space obtained through excavation by the machine while advancing the machine, wherein the machine includes a shield body, a cutter assembly disposed in front of the shield body to be rotatable about the axis parallel to the axis of the shield body and dimensioned for breaking opposed portions of the existing pipelines during the operation of advancing the shield body and a pair of opposed stabilizers positioned on an outer periphery of the shield body in such a fashion to respectively project from an outer peripheral portion of the shield body and dimensioned to be slidably engaged with the remaining portions of the pipelines opposed to each other when the shield body is advanced.

A shield tunnelling machine according to the present invention used for building a new pipeline while breaking a plurality of existing pipelines extending parallel to each other comprises a shield body, a cutter assembly disposed in front of the shield body to be rotatable about the axis parallel to the axis of the shield body and dimensioned for breaking opposed portions of the existing pipelines during the operation of advancing the shield body and a pair of opposed stabilizers positioned on the outer periphery of the shield body so as to respectively project from an outer peripheral portion of the shield body and dimensioned for slidably engaging the remaining portions of the existing pipelines opposed to each other when the shield body is advanced.

Since the stabilizers projecting from the shield body are slidably engaged with one of the portions of existing pipelines opposed to each other while the machine is advanced, the displacement of the machine in a plane perpendicular to the axis of the machine is regulated. Therefore, the shield tunnelling machine advances along the existing pipelines.

Thus, according to the present invention, the new pipeline can be built without any troublesome directional control to advance the machine along a predesigned route. Also, it is not necessary to excavate any ditch adapted for removing the existing pipes and disposing the new pipe. Further, since the engagement of the stabilizers with the remaining portions of the existing pipelines may prevent the shield body from rotating, it is possible to use a cutter assembly rotating in one direction.

BRIEF DESCRIPTION OF THE DRAWINGS

The foregoing and other objects and features of the invention will become apparent from the following description of a preferred embodiment of the invention with reference to the accompanying drawings, in which.

DETAILED DESCRIPTION OF THE PREFERRED EMBODIMENTS

Figure 1:
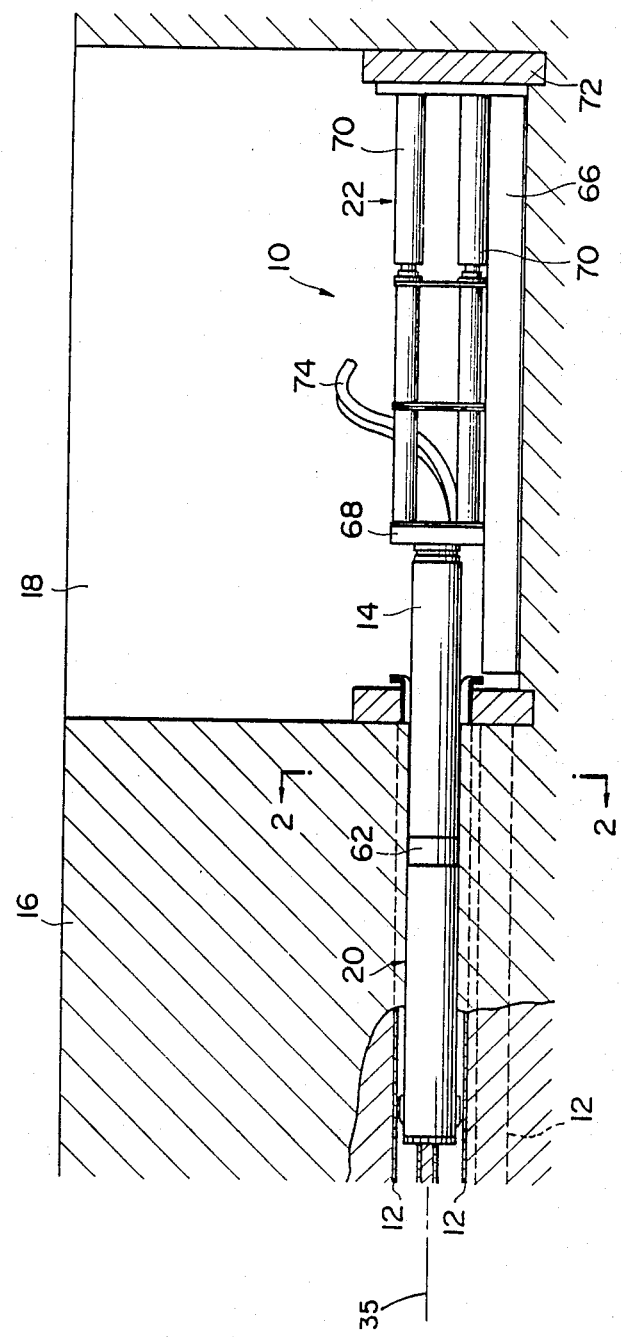
FIG. 1 shows an embodiment of a pipeline building apparatus according to the present invention.
Figure 2:
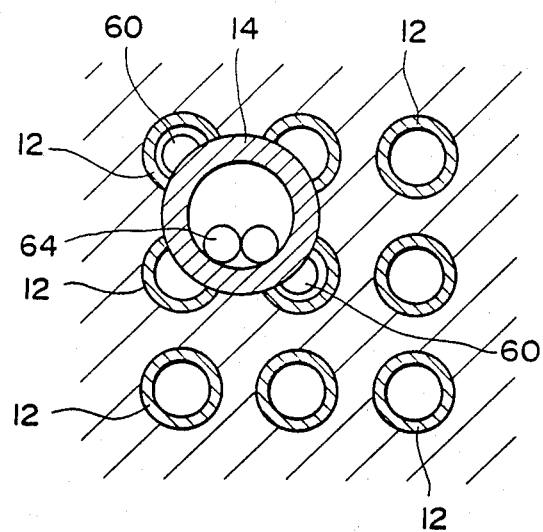
FIG. 2 is an enlarged-scale sectional view taken along the line 2—2 in FIG. 1.

A pipeline building apparatus 10, as shown in FIGS. 1 and 2, is used in construction work for breaking a portion of four adjacent existing pipes among a plurality of existing pipes 12 built in the ground and extending parallel to each other, while laying a new pipe 14 having a diameter larger than that of the existing pipes.

The pipeline building apparatus 10 comprises a shield tunnelling machine 20 propelled from a start shaft 18 built in the ground 16 toward a terminal shaft (not shown) and a basic thrust mechanism 22 for thrusting the new pipe 14 into a space obtained through excavation by the machine 20 and advancing the machine 20.

Figure 3:
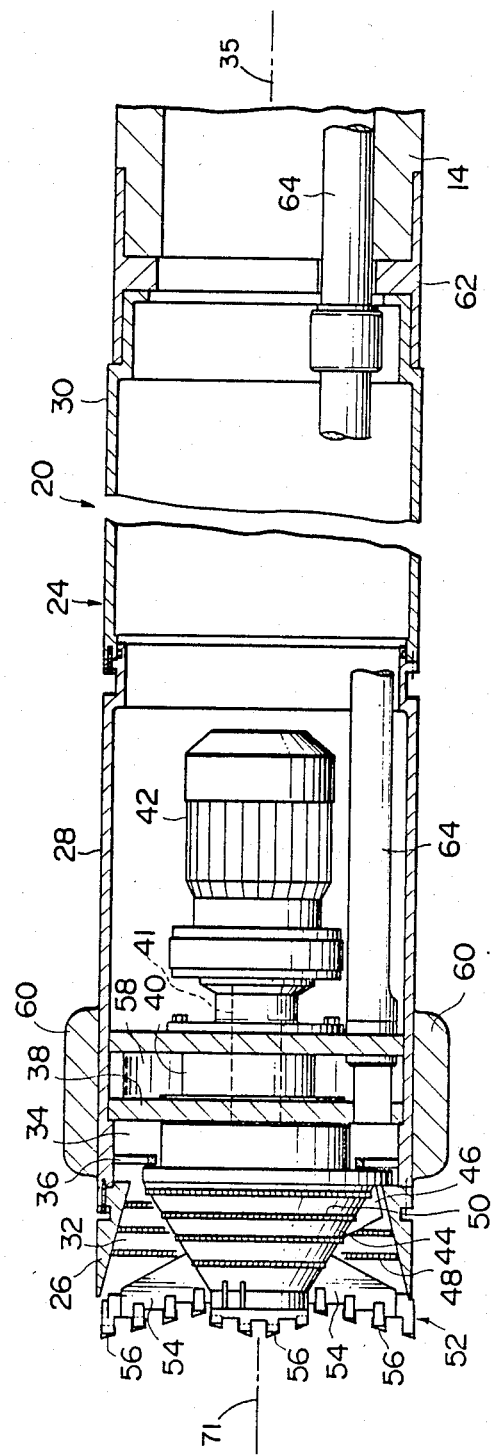
FIG. 3 shows an embodiment of a shield tunnelling machine used for a pipeline building method according to the present invention.

As shown in FIG. 3, the shield tunnelling machine 20 comprises a tubular shield body 24 which is divided into first, second and third bodies 26, 28 and 30 coaxially abutting against each other.

The first body 26 disposed in the foremost end defines a first space 32, which is a truncated conical crushing chamber having a bore gradually converging backward. The second body 28 defines a second space 34, which is a muddy water chamber leading to the first the rear end of space 32 and having a sectional area wider than that of the first space 32. The first and second bodies 26, 28 are separably connected to each other on the rear end of the first body 26 and the front end of the second body 28 by a plurality of bolts. The second and third bodies 28, 30 are separably connected to each other on the rear end of the second body 28 and the front end of the third body 30 by a plurality of bolts.

The second body 28 is provided on the inside of the front end with an annular grating 36 bounding the first and second spaces 32, 34. The grating 36 has a plurality of openings spaced from each other at equal angular intervals around the axis 35 of the shield body 24 so as to allow small excavated substances to move from the first space 32 to the second space 34, and block large excavated substances from moving from the first space 32 to the second space 34. The second body 28 is provided with a partition wall 38 for dividing the interior of the shield body 24 into front and rear areas.

The partition wall 38 fixedly supports a tubular sleeve 40 extending through the partition wall 38 in the axial direction of the shield body 24. The sleeve 40 supports a crankshaft 41 extending through the sleeve 40 rotatably in the axial direction of the shield body 24.

To the rear of the partition wall 38 is secured a drive mechanism 42 for rotating the crankshaft 41 by a plurality of bolts. The drive mechanism 42 is provided with a motor and a reduction gear and an output shaft of the drive mechanism 42 is connected to the rear end of the crankshaft 41.

The crankshaft 41 supports a rotor 44 constituting a crusher together with the first body 26. The rotor 44 is rotated eccentrically to the axis 35 of the shield body 24 along with the rotation of the crankshaft 41. The rotor 44 is shaped to have a truncated conical outer surface with the diameter gradually diverging toward the rear end side. A gap between the rear end outer surface of the rotor 44 and the rear end inner surface of the first body 26 is smaller than the diametric dimension of the opening of the grating 36 in the diametrical direction of the shield body 24.

On the truncated conical outer surface of the rotor 44 are mounted a plurality of blades 46 adapted for agitating the excavated substances in the first space 32 along with the rotation of the rotor 44 to give fluidity to the excavated substances. On the inner surface of the first body 26 and outer surface of the rotor 44, which define the first space 32, are provided respectively a plurality of projections 48 and 50 extending circumferentially.

A cutter assembly 52 is fixed to the front end of the rotor 44 and provided with a plurality of arms 54 extending from the rotor 44 in the radial direction of the shield body 24 and a plurality of cutter bits 56 fixed to the arms 54 respectively.

The partition wall 38 is provided with an annular oil chamber 58 surrounding the sleeve 40 and receiving lubricant. The oil chamber 58 communicates with a space between the crankshaft 41 and the sleeve 40 through a plurality of holes (not shown) bored in the partition wall 38 and a plurality of holes (not shown) bored in the sleeve 40. Therefore, the space between the crankshaft 41 and the sleeve 40 is filled with the lubricant.

Figure 4:
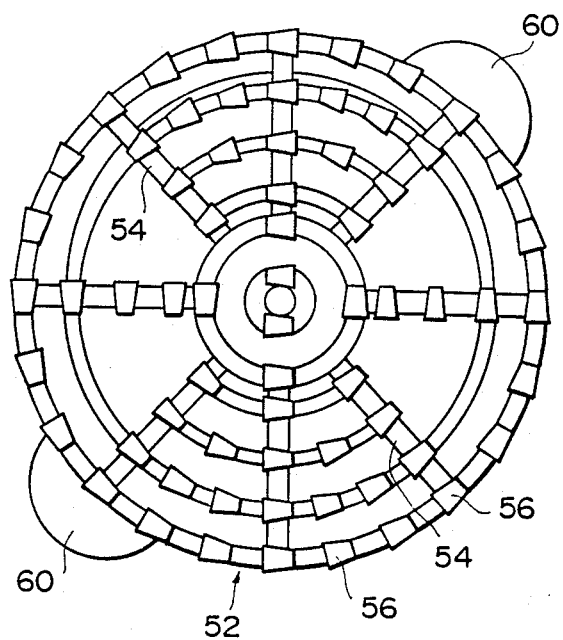
FIG. 4 is an enlarged-scale left side view showing the machine in FIG. 3.

As shown in FIGS. 3 and 4, stabilizers 60 project from the outer periphery of second body 28. The stabilizers 60 are shaped semi-cylindrically and positioned so as to extend along the body 24 on the symmetrical portions of the outer periphery of the second body 28. The outer peripheral surface of both ends of each stabilizer 60 is spherical.

An annular collar 62 is disposed between the rear end of machine 20 and the foremost new pipe 14. Also, the machine 20 is provided with a muddy water supply pipe 64 for supplying muddy water from the rear of the machine 20 to the second space 34 and a muddy water drain pipe (not shown) for draining the muddy water supplied to the second space 34 toward the rear of the machine 20 together with the excavated substances.

As shown in FIG. 1, the basic thrust mechanism 22 is provided with a base bed 66 installed on the bottom of the vertical shaft 18 so as to extend back and forth of the machine 20, a slider 68 supported on the base bed 66 to reciprocate along the base bed 66 and a plurality of jacks 70 for moving the slider 68. The jacks 70 are connected to a reaction wall 72 built in the shaft 18.

When excavation is done, the drive mechanism 42 of the machine 20 is operated while the jacks 70 are extended. Thus, the machine 20 and new pipe 14 receive an advancing force, and the rotor 44 and cutter assembly 42 rotate (revolve) about the axis 35 of the shield body 24 while rotating about their own axes 74.

As a result, a portion of four adjacent existing pipes 12 is broken and earth and sand or concrete between these pipes are excavated. Large excavated substances are crushed into small pieces by the first body 26 and rotor 44 in the first chamber 32. By so doing, the excavated substances flow from the first chamber 32 into the second chamber 34 through the grating 36. The excavated substances in the second chamber 34 are drained onto the ground through pipes 64, 74.

The jacks 70 are extended after the new pipe is disposed between the rearmost new pipe 14 and the slider 68. Thus, while the slider 68 is advanced, the new pipe 14 is thrusted into the space obtained through excavation by the machine 20, and simultaneously the machine 20 is advanced.

When the jacks 70 are extended by a predetermined length, the drive mechanism 42 is stopped. The slider 68 is then withdrawn by the contraction of the jacks 70. Under the condition as noted above, a new pipe is disposed between the slider 68 and the rearmost new pipe 14.

As shown in FIGS. 1 and 2, each of the stabilizers 60 of the machine 20 is dimensioned to be engaged slidably with the remaining portion of the existing pipes 12 opposed to each other. In this state, the stabilizers 60 are moved along with the advance of the machine 20.

Thus, according to the pipeline building apparatus 10 and shield tunnelling machine 20, since the machine 20 is restrained from the displacement on a plane perpendicular to the axis of the machine, the machine 20 can be advanced along the existing pipeline without any troublesome directional control to advance the machine along a predesigned route. Also, since the rotation of the shield body is prevented by the rotational reaction of the cutter assembly 52, it is possible to use the cutter assembly rotating in one direction.

The operation of adding a new pipe between the rearmost new pipe 14 and the slider 68 is repeated a plurality of times until the operation of renewing the existing pipes built between the start shaft and the terminal shaft is completed. Accordingly, a new pipeline having the diametric dimension larger than that of the existing pipeline is built in place of the four adjacent existing pipelines.

What is claimed is:

1. A method for building a new pipeline while breaking a plurality of existing pipelines extending parallel to each other, comprising the steps of:

advancing a shield tunnelling machine for performing an excavating operation while breaking said existing pipelines so as to form a pair of opposed remaining portions, said machine including a shield body, a cutter assembly disposed in front of said body so as to be rotatable about an axis parallel to an axis of said body, and a pair of opposed stabilizers disposed on said body so as to project respectively from an outer peripheral portion of said body; and disposing a new pipe in a space obtained through excavation by the machine;

wherein each of said stabilizers is slideably engaged with one of said remaining portions while said machine is advanced.

2. An apparatus for building a new pipeline while breaking a plurality of existing pipelines extending parallel to each other, comprising:

a shield tunnelling machine including a shield body, a cutter assembly disposed in front of said body so as to be rotatable about an axis parallel to an axis of said body; and a pair of opposed stabilizers disposed on said body so as to project respectively from an outer peripheral portion of said body; and a basic thrust mechanism for thrusting a new pipe into a space obtained through excavation by said machine while advancing said machine;

wherein said cutter assembly is dimensioned for breaking said existing pipelines so as to form a pair of opposed remaining portions while said machine is advanced, and wherein each of said stabilizers is disposed and dimensioned so as to slideably engage with one of said remaining portions while said machine is advanced.

3. A shield tunnelling machine used for building a new pipeline while breaking a plurality of existing pipelines extending parallel to each other, comprising:

a shield body;

a cutter assembly disposed in front of said body so as to be rotatable about an axis parallel to an axis of said body; and a pair of stabilizers disposed on said body so as to project respectively from an opposed outer peripheral portion of said body;

wherein said cutter assembly is dimensioned for breaking said existing pipelines so as to form a plurality of opposed remaining portions while said machine is advanced, and wherein each of said stabilizers is disposed and dimensioned so as to slideably engage with one of said remaining portions while said machine is advanced.

4. A method for building a new pipeline while breaking a plurality of existing pipelines extending parallel to each other, comprising the steps of:

providing a plurality of existing pipelines extending parallel to one another;

providing a shield tunnelling machine, said machine including a shield body, a cutter assembly disposed in front of said body so as to be rotatable about an axis parallel to an axis of said body, and a pair of opposed stabilizers disposed on said body so as to project respectively from an outer peripheral portion of said body;

advancing said shield tunnelling machine to perform an excavating operation while breaking said existing pipelines so as to form a pair of opposed remaining portions of said existing pipelines;

slideably disposing each of said stabilizers with one of said remaining portions while said machine is advanced; and disposing a new pipe in a space obtained through excavation by said machine.

\* \* \* \* \*

UNITED STATES PATENT AND TRADEMARK OFFICE
CERTIFICATE OF CORRECTION

PATENT NO. : 4,874,268
DATED : October 17, 1989
INVENTOR(S) : Toshio Akesaka

It is certified that error appears in the above—identified patent and that said Letters Patent is hereby corrected as shown below:

Column 3, lines 24-25, "the rear end of" has been deleted.
Column 3, line 26, after "of", --the rear end of-- has been inserted.
Column 3, line 46, after "40", --rotatably-- has been inserted.
Column 3, lines 47-48, "rotatably" has been deleted.
Column 4, line 47, "74" has been changed to --71--.

Signed and Sealed this

Second Day of October, 1990

Attest:

HARRY F. MANBECK, JR.

Attesting Officer

Commissioner of Patents and Trademarks